July 19, 1938.    E. R. WILES    2,123,982
PROCESS OF MAKING WAXES
Filed Feb. 29, 1936
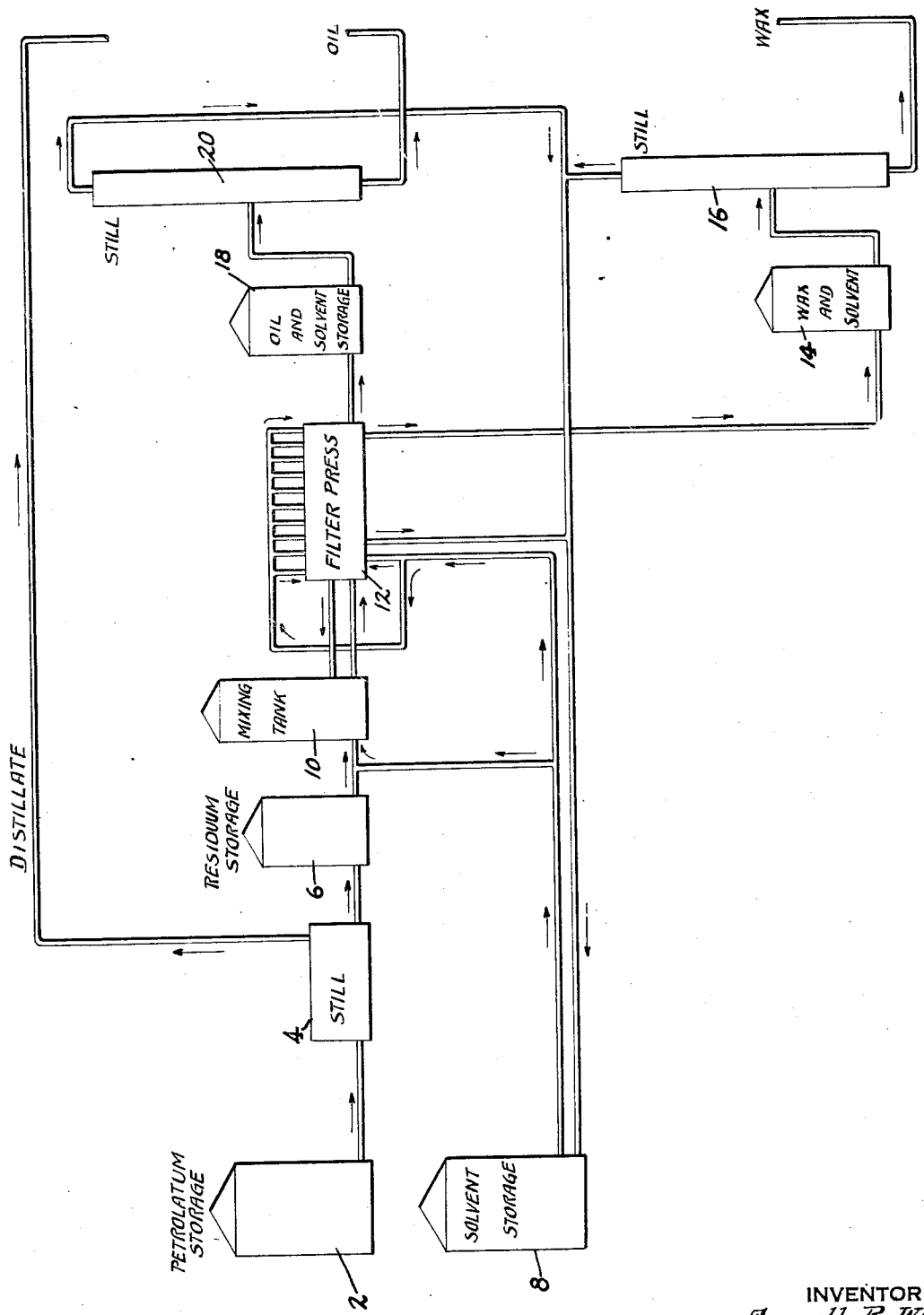
INVENTOR
*Everett R. Wiles*
BY
*Hoguet, Neary & Campbell*
ATTORNEYS Patented July 19, 1938

2,123,982

UNITED STATES PATENT OFFICE 2,123,982

PROCESS OF MAKING WAXES

Everett R. Wiles, Barnsdall, Okla.

Application February 29, 1936, Serial No. 66,445

8 Claims. (Cl. 196—18)

The present invention is directed to a process of treating petrolatum wax to separate therefrom high-melting point waxes which are ductile and adhesive over a wide range of temperatures.

Heretofore, in the production of high-melting point waxes, as evidenced by the patent to Henderson et al. No. 1,937,518, mixtures of petrolatum stock including slack wax have been recrystallized from wax anti-solvents and then fractionally distilled, the various fractions and residue or bottoms separately collected, and each again recrystallized to separate the desired melting point waxes.

This process has the disadvantage that the petrolatum stock is recrystallized a plurality of times to eliminate a portion of the oil prior to the distillation step. Also, the distillation step in itself does not produce a clean separation of the various waxes of different boiling points, but rather results in fractions containing mixtures of waxes of varying boiling points. The recrystallization of the waxes in the various fractions, also, does not produce a clean separation of waxes of high melting points, because the temperature of crystallization at which the waxes are precipitated in each of the fractions is such as to precipitate substantially all of the waxes in each fraction, thus producing mixtures of waxes and a final product of a much lower melting point than is obtainable by the process to be hereinafter described.

The invention hereinafter described relates to the production of waxes having melting points of approximately 160° F. or higher from an undistilled residue of a petrolatum distillation, said undistilled residue containing only waxes having high boiling points and high melting points, and some oils having high boiling points.

The present invention further includes a simplified process of producing the above-mentioned waxes, which avoids repeated crystallization of the wax-bearing material, and yet produces an oil-free product with a higher melting point and with characteristics of great ductility and adhesiveness.

The invention further includes a process which is capable of being practiced commercially because of its high yield of the product and hence lessened cost and its freedom from the necessity of acquirement of special equipment for practicing the process.

The invention further includes the separation of the higher melting point waxes from the mixture of high-melting point waxes in the undistilled residues by a fractional precipitation to produce waxes having melting points of approximately 160° F.

The invention further includes the treatment of the precipitated waxes to render them filterable, filtering the precipitated waxes and then washing the filter cake to render it oil-free.

The invention further includes the steps of re-dissolving the waxes in a solvent and separating the solvent from the waxes by distillation to produce a solvent-free and oil-free product having the desired melting point, and being also characterized by extreme ductility and adhesiveness over a wide range of temperatures.

The invention further includes the waxes produced by the improved process. These new waxes are characterized by having melting points in the vicinity of 160° F. and above and with desirable adhesive, film forming, and ductile properties, even at temperatures as low as 32° F. These characteristics render these waxes desirable for use as coating materials and many other purposes which will be evident from the disclosure.

The process consists in treating petrolatum wax which has been separated from a petroleum stock in any of the conventional ways such as cold settling or centrifuging in the presence of a solvent-anti-solvent.

The petrolatum wax so separated is reduced by distillation with steam to a residue having a flash test of at least 500° F. thereby removing all the lower boiling point waxes and low boiling hydrocarbon oils. Sufficient steam should be used that decomposition of the stock does not take place.

One part of the petrolatum residue is then brought to a temperature of approximately 180° F. plus or minus 10°, mixed with and dissolved in approximately 4–6 parts of ethylene dichloride, or a mixture of solvents, such as benzol and acetone or naphtha and butanol.

The solvent used, preferably ethylene dichloride, is characterized by the ability to dissolve waxes at approximately 180° F. but at a lower temperature, that is 110° F., causes precipitation of the waxes in filterable form.

The mixture of solvent, wax and some occluded oil, is transferred to a tank equipped with agitating means, and agitated while the temperature of the mixture is reduced to a predetermined point. The melting point of the final wax product depends upon the temperature to which the mixture is reduced.

This step of the process, therefore, amounts to a fractional precipitation of the waxes, because the lower melting point waxes are soluble in the solvent at temperatures below the precipitation temperature of the higher melting point waxes.

If, for example, it is desired to produce a wax with a melting point of 160° F., the mixture is cooled to 80° F. and maintained at this temperature over a period up to four hours, while being constantly agitated. The agitation causes formation of filterable crystals of the wax which are removed in a manner hereinafter described.

The treatment in the agitating tank is dependent upon the condition of the original petrolatum stock being processed. If the original stock is dark in color, approaching black, indicating the presence of a considerable proportion of asphaltic bodies, it is necessary to hold the mixture over an extended period of time, that is, up to four hours. If the original stock is light in color, the stock is held in the tank only a period approaching an hour, or even less. The presence of asphaltic bodies retards crystalline formation, thereby necessitating an increase in the length of time of agitation.

When the precipitated wax has attained a filterable form, it is passed to a filter press, for removal of the wax.

The preferred form of filter press is one having canvas or paper covered leaves enclosed in a vapor tight case, capable of withstanding a pressure of 50 pounds per square inch, and having additional inlet nozzles adjacent the leaves of the press for a purpose later to be described.

A sufficient quantity of the mixture of crystalline wax, solvent and occluded oil is pumped into the press to deposit a layer of the wax of appreciable thickness on the leaves of the press, and the excess solvent oil and undeposited wax is blown from the press by gas under pressure. The gas pressure is maintained in the press while clean ethylene dichloride is forced through the cake to wash and remove oil therefrom. The washing is continued until the filtrate coming from the filter press is free from oil, at which time the remainder of the solvent is blown out by the gas under pressure. It is important that during the whole filtering and washing operation, the pressure within the filter should not be allowed to drop because otherwise the cakes of wax would fall from the filter leaves, rendering washing of the wax cakes impossible.

At the conclusion of the washing and draining steps, clean ethylene dichloride is forced through the nozzles arranged adjacent the filter leaves to strip the wax cakes therefrom and mix them with the solvent. The mixture is then transferred to a still where the temperature is raised to a point sufficiently high to distill off the solvent, refluxing being used to assure a clean separation of the solvent and the wax. The residue is cooled, and if colored may be further treated in any conventional way such as with fuller's earth, to produce a substantially colorless wax.

What occurs in the preceding process is believed to be as follows:

The distillation of the petrolatum stock to produce a bottoms having a flash point of above 500° F., eliminates the low-boiling point, low melting point oils in the stock, thus producing a bottoms residue which contains only those waxes and oils of high-boiling points. The waxes remaining in the bottoms are of the high-melting point group only.

The fractional precipitation separates the highest melting point waxes from the bottoms fraction along with a small amount of occluded high boiling point oil. The wax precipitate, due to the presence of asphaltic bodies, may be filterable only with considerable difficulty, because the asphaltic bodies retard crystallization. The agitation in conjunction with the precipitation step encourages crystal growth and renders the wax filterable. The washing step removes all of the occluded oil from the wax crystals. By redissolving the wax and fractionally distilling, a clean separation is produced, eliminating all of the ethylene dichloride, and permitting formation again of very fine needle-like crystals in the final product.

It will thus be understood that the described process avoids the necessity of repeated crystallizations of the wax, and thus reduces not only the time required to obtain the final product, but also results in the desired feature of treating a relatively smaller amount of the original petrolatum stock with the solvents, thus rendering the process more economical. It will also be understood that the treatment of the stock will require less time, and thereby result in the treatment of a greater amount of material with a consequently greater yield of product than has heretofore been possible.

The preceding remelting and distillation steps change the crystalline structure of the wax from a coarse crystalline formation to a microcrystalline structure with greatly improved physical characteristics. The reduced size of the crystals causes the wax to have greater ductility over a wide temperature range probably because of intercrystalline slippage, and for some reason not clearly understood, the wax is very adhesive over an equally wide range of temperatures.

By way of a specific embodiment of applicant's process, the description herein being taken in connection with the drawing, petrolatum obtained from the Barnsdall Refining Company is drawn from petrolatum storage tank 2 to still 4 and distilled to 50% bottoms, said bottoms having a flash point of approximately 550° F. The residuum or bottoms is delivered to storage tank 6. To the 50% residue was added 4–6 volumes of ethylene dichloride from solvent storage tank 8, solution of the residue in the solution being effected at 175° F. in the rinsing tank 10. The solution was then cooled to 80° F. and agitated to produce a filterable form of wax, then filtered and washed in a filter press 12 having duck coverings on the leaves. After washing with ethylene dichloride, the cakes of wax were again dissolved in ethylene dichloride and delivered to the wax and solvent storage tank 14 and the solvent then distilled off in still 16 leaving a wax residue. The oil and solvent from filter press 12 is delivered to a storage tank 18 from which it is drawn off to a still 20 where the solvent is distilled off and returned for reuse to the solvent storage tank 8.

The wax produced had a melting point of 161.5° F. and a refractive index at 176° F. of 1.4524 and when examined under a microscope, with polarized light, disclosed a fine crystalline structure, containing needle-like crystals.

A sample of this wax was melted and spread on a tin sheet, and chilled to 32° F., and upon bending of the sheet, sharply, no fracture was produced in the wax coating, thereby showing that the ductility of the wax even at low temperatures was very satisfactory. Not only that, but the wax coating did not chip or flake from the sheet, thereby disclosing a property of improved adhesiveness.

Three other waxes produced from Barnsdall petrolatum in a similar manner gave the following values:

|   | M. P. | nD 176° F. |
|---|---|---|
| B | 158.4 F. | 1.4520 |
| C | 160.1 F. | 1.4510 |
| D | 160.7 F. | 1.4545 |

The foregoing examples are illustrative only, and should not be construed as limiting the scope of the invention because it is obvious that dependent upon the crude stock used, there may be variations in temperature of crystallization to produce waxes of varying melting points, different solvents may be used and many other phases of the invention may be varied, all falling within the scope of the appended claims.

I claim:

1. A process of separating high-melting point waxes from petrolatum stock which comprises reducing the stock to between 20% to 50% bottoms, dissolving the bottoms in an excess of ethylene dichloride, fractionally precipitating the wax from the solution by chilling to approximately room temperature with agitation, filtering, washing the filtered precipitated wax with ethylene dichloride, redissolving the wax in ethylene dichloride, and distilling off the solvent.

2. A process of separating high-melting point waxes from petrolatum stock which comprises distilling the stock to between 20% to 50% bottoms, dissolving the bottoms in an excess of ethylene dichloride, fractionally precipitating the wax from the solution by chilling to approximately 80° F. with agitation, filtering, washing the precipitated wax with fresh ethylene dichloride, redissolving the precipitated wax in hot ethylene dichloride, and separating the solvent from the wax by distillation.

3. A process of separating high-melting point waxes from petrolatum stock which comprises distilling the stock to produce a bottoms having a flash point of over 500° F., diluting one volume of the bottoms with 4–6 volumes of ethylene dichloride at a temperature sufficient to dissolve all of the waxes present, chilling the solution to precipitate the desired fraction of the waxes, filtering out the precipitated waxes, washing the wax cake with clean solvent, redissolving the washed wax cake in additional clean solvent and separating the waxes from the solvent by distillation.

4. A process of separating high-melting point waxes from petrolatum stock comprising dissolving a residuum of a petrolatum distillation in hot ethylene dichloride, chilling the solution to approximately 80° F. to precipitate the desired wax fraction, filtering the precipitated wax in a filter press, blowing out the excess solvent, oil and undeposited wax, washing the wax cake with clean ethylene dichloride, blowing out the excess ethylene dichloride, forcing clean ethylene dichloride into the press to break up the wax cake, dissolving the wax in the ethylene dichloride and separating the wax from the solvent by distillation.

5. A process of separating high melting point waxes from petrolatum stock which comprises reducing the stock by distillation to a bottoms having a flash point above 500° F., dissolving the bottoms in ethylene dichloride, chilling the solution to between 75° F. and 85° F. to precipitate the high-melting point waxes, filter pressing the mixture to separate the precipitated wax, washing the wax cake so formed with clean ethylene dichloride, redissolving the cake in fresh ethylene dichloride, and distilling the last solution to separate the ethylene dichloride from the waxes.

6. A process of preparing high melting point waxes which comprises dissolving an undistilled residue of a petrolatum distillation in an excess of ethylene dichloride, cooling the solution to approximately room temperature, to precipitate the desired fraction of waxes, agitating the mixture to promote crystalline growth in the waxes, and filtering the precipitated waxes from the mixture.

7. The process defined in claim 6 in which the filtered waxes are washed with clean ethylene dichloride, until they are oil-free.

8. The process defined in claim 6 in which the filtered waxes are washed with clean ethylene dichloride, redissolved in hot ethylene dichloride, and the solvent is separated from the wax, by distillation.

EVERETT R. WILES.